（12） United States Patent
Yamada et al.

(10) Patent No.: US 10,156,186 B2
(45) Date of Patent: Dec. 18, 2018

(54) ACTUATOR FOR LINK MECHANISM FOR INTERNAL COMBUSTION ENGINE, AND METHOD FOR ASSEMBLING SAID ACTUATOR

(71) Applicant: HITACHI AUTOMOTIVE SYSTEMS, LTD., Hitachinaka-shi, Ibaraki (JP)

(72) Inventors: Yoshihiko Yamada, Fujisawa (JP); Kishiro Nagai, Atsugi (JP); Junichiro Onigata, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 108 days.

(21) Appl. No.: 15/506,373

(22) PCT Filed: Jul. 3, 2015

(86) PCT No.: PCT/JP2015/069230
§ 371 (c)(1),
(2) Date: Feb. 24, 2017

(87) PCT Pub. No.: WO2016/031392
PCT Pub. Date: Mar. 3, 2016

(65) Prior Publication Data
US 2017/0254260 A1  Sep. 7, 2017

(30) Foreign Application Priority Data

Aug. 26, 2014 (JP) ................................. 2014-171114

(51) Int. Cl.
*F02D 15/02* (2006.01)
*F02B 75/04* (2006.01)

(52) U.S. Cl.
CPC ............ *F02B 75/04* (2013.01); *F02B 75/045* (2013.01); *F02D 15/02* (2013.01); *Y02T 10/12* (2013.01)

(58) Field of Classification Search
CPC ........ F02B 75/04; F02B 75/045; F02D 15/02; Y02T 10/12
(Continued)

(56) References Cited

U.S. PATENT DOCUMENTS 1,909,372 A * 5/1933 McCollum ............. F02B 75/32
123/197.1
2004/0149243 A1 8/2004 Yamada et al.
(Continued)

FOREIGN PATENT DOCUMENTS

JP  H11-036833 A  2/1999
JP  2004-183644 A  7/2004
(Continued)

*Primary Examiner* — Maguerite McMahon
(74) *Attorney, Agent, or Firm* — Foley & Lardner LLP

(57) ABSTRACT

Disclosed is an actuator for a link mechanism of an internal combustion mechanism, which includes: a control link (12); an arm link (13) pivotably connected to the other end of the control link; a control shaft (11) to which the arm link is fixed by press-fitting; a housing body (28) having a support hole (30) formed to rotatably support therein the control shaft and an accommodation room (28b) formed in a direction intersecting an center axis of the support hole to accommodate therein the connection site between the arm link and the control link. The housing body further has through holes formed therethrough from an outer surface of the housing body to the accommodation room in an axial direction of the control shaft such that insertion support parts (72 to 74) of a support jig (70) can be inserted through and removed from the respective through holes.

19 Claims, 12 Drawing Sheets

(58) Field of Classification Search
USPC .................................................. 123/48 B
See application file for complete search history.

(56) References Cited

U.S. PATENT DOCUMENTS

| | | |
|---|---|---|
| 2007/0095311 A1 | 5/2007 | Tateno et al. |
| 2013/0327302 A1* | 12/2013 | Hiyoshi .............. F02B 75/04 |
| | | 123/48 R |
| 2013/0340694 A1 | 12/2013 | Nakamura |
| 2014/0041607 A1* | 2/2014 | Hiyoshi ................ F01L 1/34 |
| | | 123/90.15 |
| 2015/0219022 A1* | 8/2015 | Nagai .................. F02B 75/045 |
| | | 123/48 B |

FOREIGN PATENT DOCUMENTS

| | | |
|---|---|---|
| JP | 2011-169152 A | 9/2011 |
| JP | 2014-005756 A | 1/2014 |
| WO | WO-2006/025565 A1 | 3/2006 |
| WO | WO-2013/080673 A1 | 6/2013 |

* cited by examiner (A)

(B)

ACTUATOR FOR LINK MECHANISM FOR INTERNAL COMBUSTION ENGINE, AND METHOD FOR ASSEMBLING SAID ACTUATOR

FIELD OF THE INVENTION

The present invention relates to an actuator for a link mechanism of an internal combustion engine, which is used as e.g. a variable compression ratio mechanism for varying an actual compression ratio of the internal combustion engine, and to a method of assembling the actuator.

BACKGROUND ART

As a link mechanism of an internal combustion engine, conventionally known is a variable compression ratio mechanism of the type disclosed in Patent Document 1.

This variable compression ratio mechanism utilizes a multi-link type piston-crank system so as to change the stroke characteristics of each piston and thereby vary the actual mechanical compression ratio of the internal combustion engine.

More specifically, the piston is connected to a crankshaft via upper and lower links. The attitude of the lower link is controlled by means of an actuator. The actual compression ratio of the internal combustion engine is varied by changing the stroke characteristics of the piston according to the attitude of the lower link.

The actuator includes: a housing; a reduction gear unit and a drive motor, both of which are mounted to an outer side of the housing; a control shaft (as a second control shaft in the above-mentioned patent document) rotatably supported by the housing and adapted to receive a torque from through the reduction gear unit; an eccentric shaft part (as a second eccentric shaft part in the above-mentioned patent document) integrally formed on a tip end portion of the control shaft; and a connection link having one end portion connected to the lower link and the other end portion connected to an eccentric shaft part of a control shaft that extends substantially in parallel with the crankshaft.

When the rotation position of the control shaft is shifted by the torque outputted from the drive motor and the reduction gear unit, the attitude of the lower link is controlled by such positional shift of the control shaft through the eccentric shaft part and the connection link.

PRIOR ART DOCUMENTS

Patent Document

Patent Document 1: JP 2011-169152 A

SUMMARY OF THE INVENTION

Problem to be Solved by the Invention

In the above-mentioned actuator of the conventional variable compression ratio mechanism, the control shaft and the eccentric shaft part are formed integrally as one piece. In order for the control shaft and the eccentric shaft part to be assembled together into the housing, the housing needs to have a relatively large insertion hole such that both of the control shaft and the eccentric shaft part can be inserted through the insertion hole, or needs to be divided into separate parts such that these housing parts can support therebetween the control shaft by radially sandwiching a journal portion of the control shaft. This however leads to upsizing of the housing.

It is conceivable to form the control shaft and the eccentric shaft part as separate pieces, rotatably insert the control shaft in the housing and press-fit the eccentric shaft part on the control shaft in a state that the eccentric shaft part is inserted in an insertion hole of the housing. In the case where the eccentric shaft part is press-fitted on the control shaft, however, the eccentric shaft part is difficult to form with a press-fit load receiving portion. This leads to cost increase due to deterioration of work efficiency.

The present invention has been made in view of the above technical problems. It is an object of the present invention to provide an actuator for a link mechanism of an internal combustion mechanism, capable of achieving not only improvement of component assembling efficiency but also reduction of cost, and to provide a method of assembling the actuator.

Means for Solving the Problem

According to one aspect of the present invention, there is provided a method of assembling an actuator for a link mechanism of an internal combustion engine, the actuator comprising:

a control link having one end connected to the link mechanism of the internal combustion engine;

an arm link pivotally connected to the other end of the control link;

a control shaft to which the arm link is fixed by press-fitting;

a housing having a support hole formed to rotatably support therein the control shaft and an accommodation room formed in a direction intersecting a center axis of the support hole to accommodate therein at least a part of the arm link; and a motor arranged to rotate and drive the control shaft;

the housing further having a through hole formed therethrough from an outer surface of the housing to the accommodation room in an axial direction of the control shaft, the method comprising:

inserting a support jig into the through hole from the outside of the housing, thereby allowing a tip end portion of the support jig to protrude in the accommodation room;

inserting the arm link into the accommodation room and bringing one side surface of the arm link into contact with the tip end portion of the support jig; and inserting the control shaft into the support hole and press-fitting the control shaft in a press-fitting hole of the arm link.

Effects of the Invention

According to the present invention, it is possible to improve the assembling efficiency of the actuator and reduce the cost of the actuator.

BRIEF DESCRIPTION OF DRAWINGS

FIG. 11A is a perspective view of the housing body; and FIG. 11B is a perspective view showing a state in which the insertion support prats are inserted in the housing body.

FIG. 12A is a perspective view showing a state before the insertion of the arm link and the second control shaft; and FIG. 12B is a perspective view showing a state after the insertion of the arm link and the second control shaft.

FIG. 11A is a section view showing a state immediately before the press-fitting of the second control shaft; and FIG. 11B is a section view showing a state after the completion of the press-fitting of the second control shaft.

DESCRIPTION OF EMBODIMENTS

Hereinafter, actuators for link mechanisms of internal combustion engines according to exemplary embodiments of the present invention will be described in detail below with reference to the drawings. Each of the following embodiments specifically refers to an actuator applied to a variable compression ratio mechanism (VCR) of an in-line four-cylinder gasoline internal combustion engine for mechanical compression ratio control.

[First Embodiment]

Figure 1:
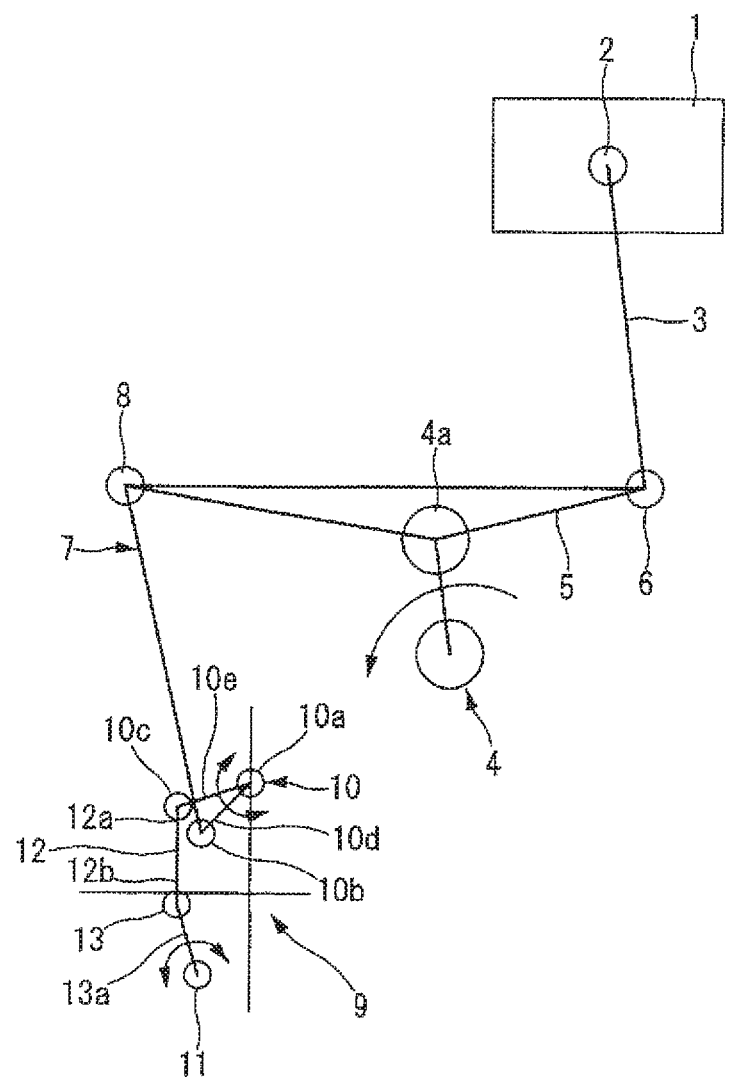
FIG. 1 is a schematic view of a variable compression ratio mechanism to which the present invention is applicable.

FIG. 1 is a schematic view of the variable compression ratio mechanism to which the present invention is applicable. This variable compression ratio mechanism is similar in structure to that disclosed in FIG. 1 of the above-mentioned prior art document JP 2011-169152 A. The structure of the variable compression ratio mechanism will be thus briefly discussed below.

The variable compression ratio mechanism includes: an upper link 3 pivotally connected at an upper end thereof to a piston pin 2 of each piston 1, which reciprocates within a cylinder of a cylinder block of the internal combustion engine; and a lower link 5 rotatably coupled to a crankpin 4a of a crankshaft 4, with a lower end of the upper link 5 pivotally connected to the lower link 5 via a connection pin 6. A first control link 7 is pivotally connected at an upper end thereof to the lower link 5 via a connection pin 8.

A lower end portion of the first control link 7 is connected to a connection unit 9. The connection unit 9 is provided with a plurality of link members and, more specifically, has a first control shaft 10, a second control shaft 11 as a control shaft and a second control link 12 as a control link connecting these shafts 10 and 11.

The first control shaft 10 extends within the engine in parallel with the crankshaft 4 along the cylinder-row direction, and includes: a first journal portion 10a rotatably supported by the engine body; a plurality of control eccentric shaft portions 10b to each of which the lower end portion of the first control link 7 for each cylinder is mounted; and an eccentric shaft portion 10c to which a first end portion 12a of the second control link 12 is pivotally mounted.

The control eccentric shaft portion 10b is eccentrically offset by a predetermined amount from the first journal portion 10a though a first arm portion 10d. The eccentric shaft portion 10c is eccentrically offset by a predetermined amount from the first journal portion 10a though a second arm portion 10e.

The second control shaft 11 is rotatably supported in the after-mentioned housing 20 through a plurality of journal portions 23a and 23c. An arm link 13 is mounted to the second control shaft 11 and pivotally connected to a second end portion 12b of the second control link 12.

Figure 2:
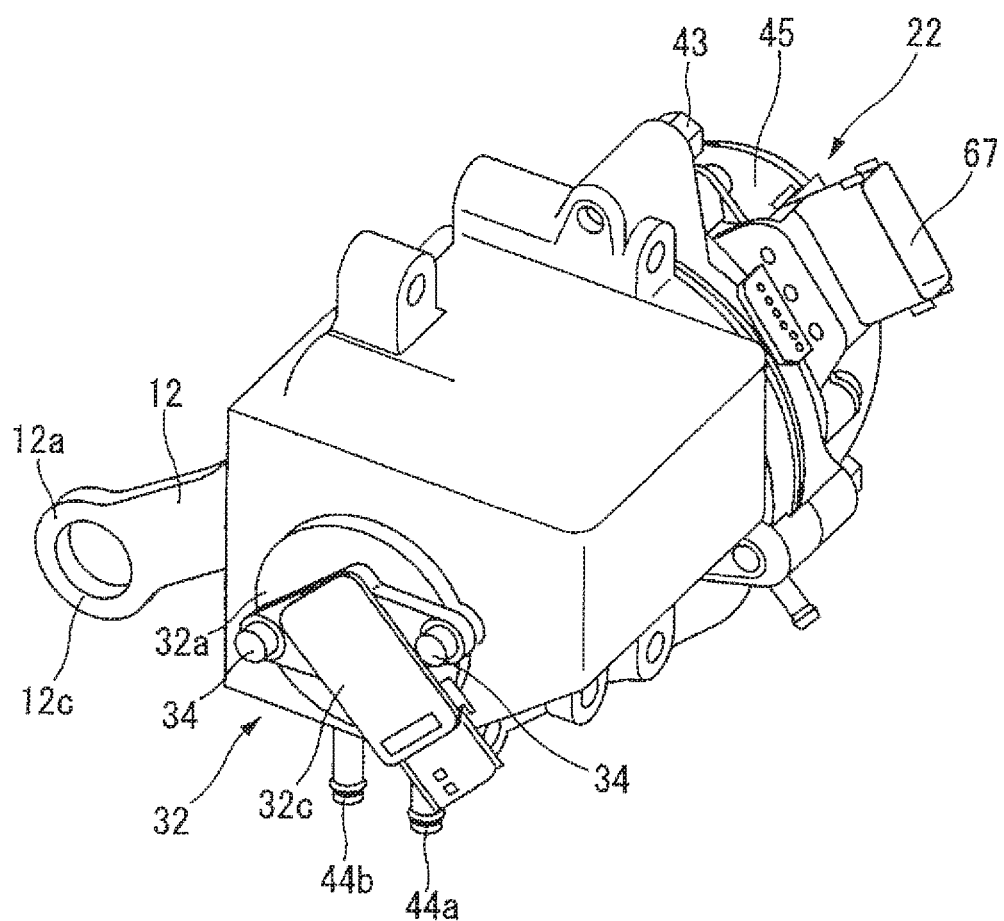
FIG. 2 is a perspective view of an actuator of the variable compression mechanism to which the present invention is applicable.
Figure 3:
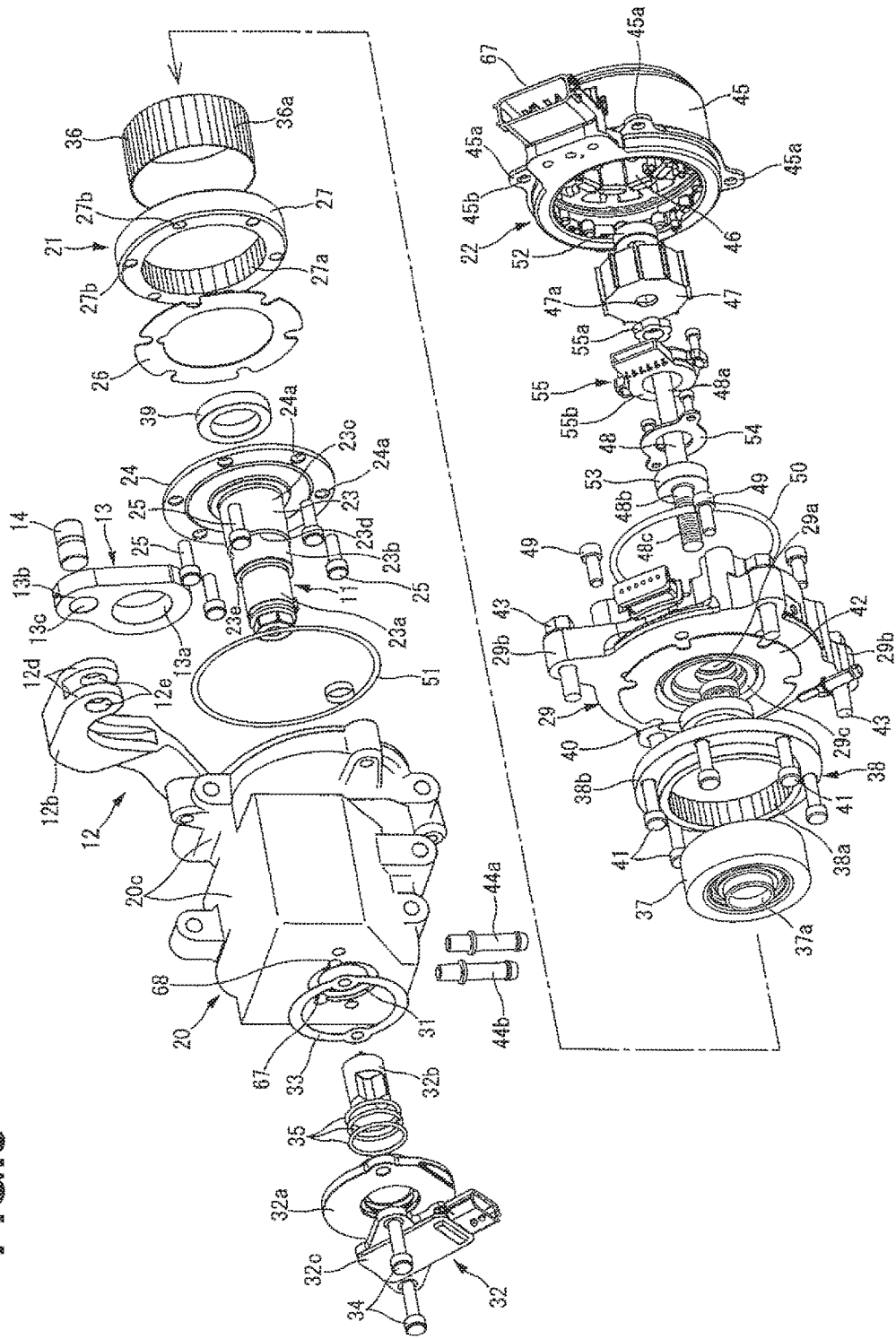
FIG. 3 is an exploded perspective view of the actuator according to a first embodiment of the present invention.
Figure 4:
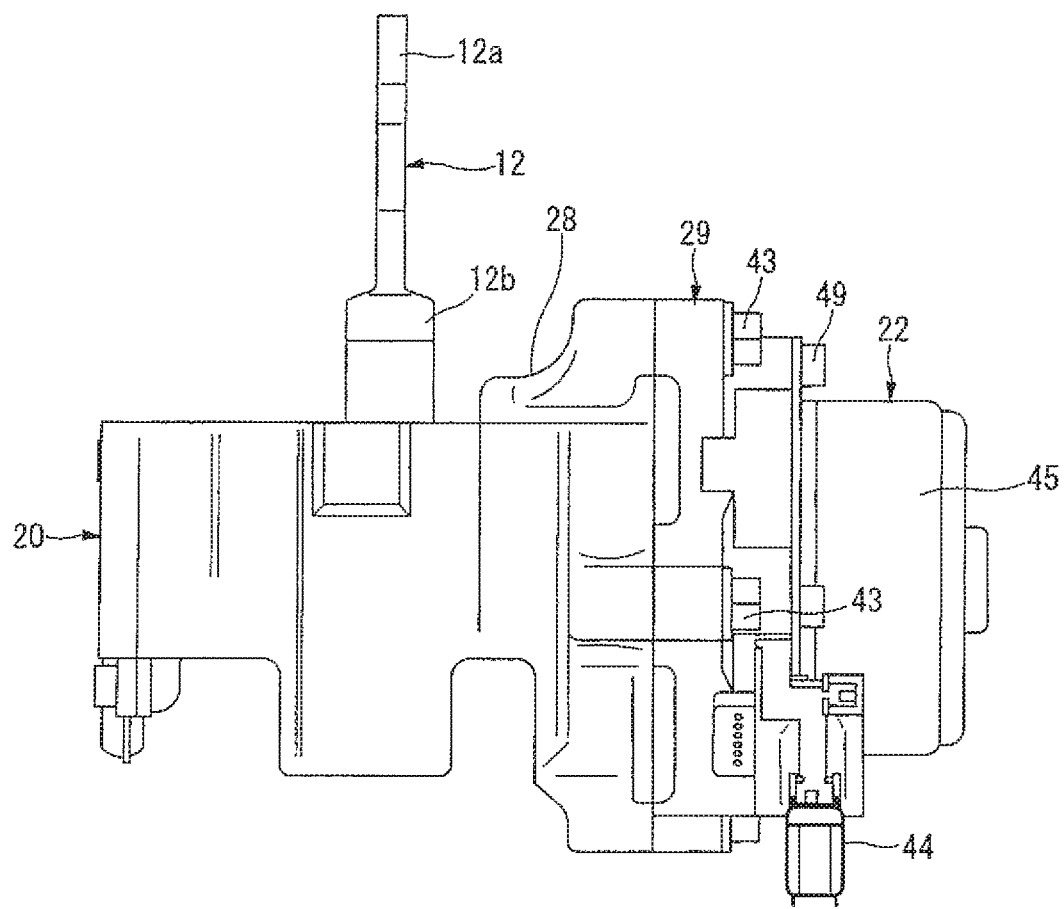
FIG. 4 is a plan view of the actuator.
Figure 5:
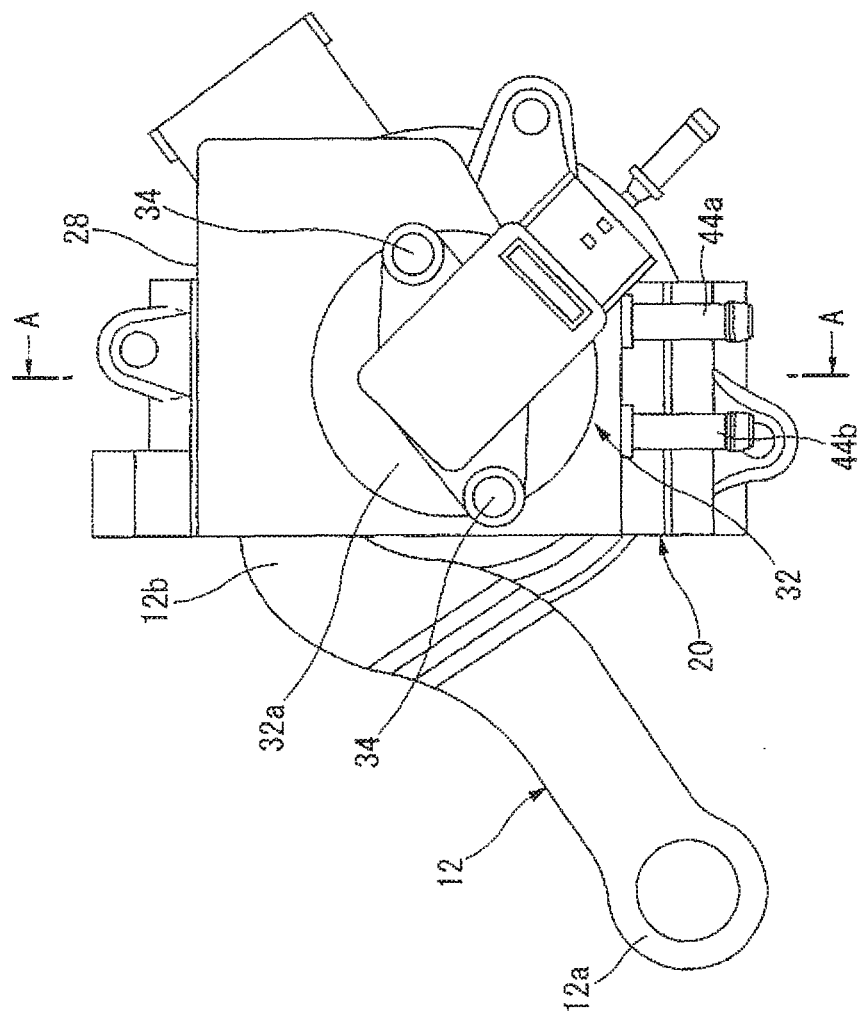
FIG. 5 is a side view of the actuator.

As shown in FIGS. 2 and 3, the second control link 12 has a lever shape. The first end portion 12a of the second control link 12, which is connected to the eccentric shaft portion 10c, is substantially straight-shaped. The second end portion 12b of the second control link 12, to which the arm link 13 is connected, is substantially arc-shaped. An insertion hole 12c is formed through a tip end region of the first end portion 12a such that the eccentric shaft portion 10c is pivotally inserted in the insertion hole. A tip end region of the second end portion 12b is bifurcated into tip ends 12d, 12d such that the after-mentioned protrusion portion 13b of the arm link 13 is held between the tip ends 12d, 12d. Fitting holes 12e, 12e are formed through the respective tip ends 12d, 12d of the second end portion 12b. A connection pin 14, to which the protrusion portion 13b is rotatably mounted, is press-fitted in the fitting holes 12e, 12e.

The arm link 13 is provided separately from the second control shaft 11 and formed of iron-based metal material in a thick annular shape. A press-fitting hole 13a is formed through a center portion of the link arm 13 and fixed by press fitting on a fixing portion 23b between the front and rear journal portions 23a and 23c of the second control shaft 11. The protrusion portion 13b is integrally formed in a U-shape on an outer circumferential surface of the arm link 13 so as to protrude in the radial direction. A connection hole 13c is formed in the protrusion portion 13b such that the connection pin 14 is rotatably supported in the connection hole 13c. The center axis of the connection hole 13c (connection pin 14) is radially offset by a predetermined amount from the axis of the second control shaft 11 through the protrusion portion 13b.

A reduction gear unit 21 and a drive motor 22 are provided as a part of the actuator. The rotation position of the second control shaft 11 is shifted by a torque transmitted from the drive motor 22 through the reduction gear unit 21. The first control shaft 10 is rotated by such positional shift of the second control shaft 11 through the second control link 12. The attitude of the lower link 5 is changed as the position of the lower end portion of the first control link 7 is shifted by the rotation of the control shaft 10. The engine compression ratio is varied by changing the stroke characteristics of the piston according to the attitude of the lower link 5.

As shown in FIGS. 2 to 6, the actuator generally includes: the second control shaft 11; the housing 20 rotatably supporting therein the second control shaft 11; the reduction gear unit 21 disposed within a rear end space of the housing 20; and the drive motor 22 disposed on a rear end side of the housing 20 as shown in FIGS. 2 to 6.

The second control shaft 11 has a shaft body 23 formed in one piece of iron-based metal material and a fixing flange 24 integrally provided on a rear end side of the shaft body 23. The shaft body 23 is axially stepped in diameter and, more specifically, includes: the small-diameter first journal portion 23a located on the tip end side; the middle-diameter fixing portion 23b located at a middle position; and the large-diameter second journal portion 23b located on the fixing flange 24 side. The shaft body 23 further includes a first stepped portion 23d formed between the fixing portion 23b and the second journal portion 23c and a second stepped portion 23e formed between the first journal portion 23a and the fixing portion 23b.

The first stepped portion 23d is adapted to, when the press-fitting hole 13a of the arm link 13 is press-fitted on the fixing portion 23b from the first journal portion 23a side, axially make contact with one hole edge of the press-fitting hole 13a on the second journal portion 23c side and thereby restrict movement of the link arm 13 in a direction toward the second journal portion 23c. The second stepped portion 23e is adapted to, when the shaft body 23 is inserted in a support hole 30 of the housing, make contact with the after-mentioned stepped hole edge 30c of the support hole 30 and restrict axial movement of the shaft body 23.

Six bolt insertion holes 24a are formed through an outer circumferential portion of the fixing flange 24 at circumferentially equally spaced intervals. Six bolts 25 are inserted in the respective bolt insertion holes 24a such that the fixing flange 24 is coupled to a circular spline 27 as an internal gear of the reduction gear unit 21 through a thrust plate 26 by these bolts 25.

The fixing flange 24 includes an annular first bearing support portion 24b formed on an inner circumferential side thereof so as to protrude toward a first accommodation room 28a of the after-mentioned housing body 28. A first support groove 24c is formed in an inner circumference of the first bearing support portion 24b.

The housing 20 has its housing body 28 formed of aluminum alloy in a substantially cube shape as a whole. The first accommodation room 28a is defined as a large-diameter annular groove within a rear end side of the housing body 28. The housing 20 also has a cover 29 closing one opening end of the first accommodation room 28 via an O-ring 51.

Further, a second accommodation room 28b is defined laterally in the housing body 28 at a position in front of the first accommodation room 28a. The support hole 30, in which the shaft body 23 of the control shaft 23 is inserted and arranged, is formed through the housing body 28 so as to axially extend from the bottom of the first accommodation room 28a in a direction perpendicular to the second accommodation room 28b.

Figure 7:
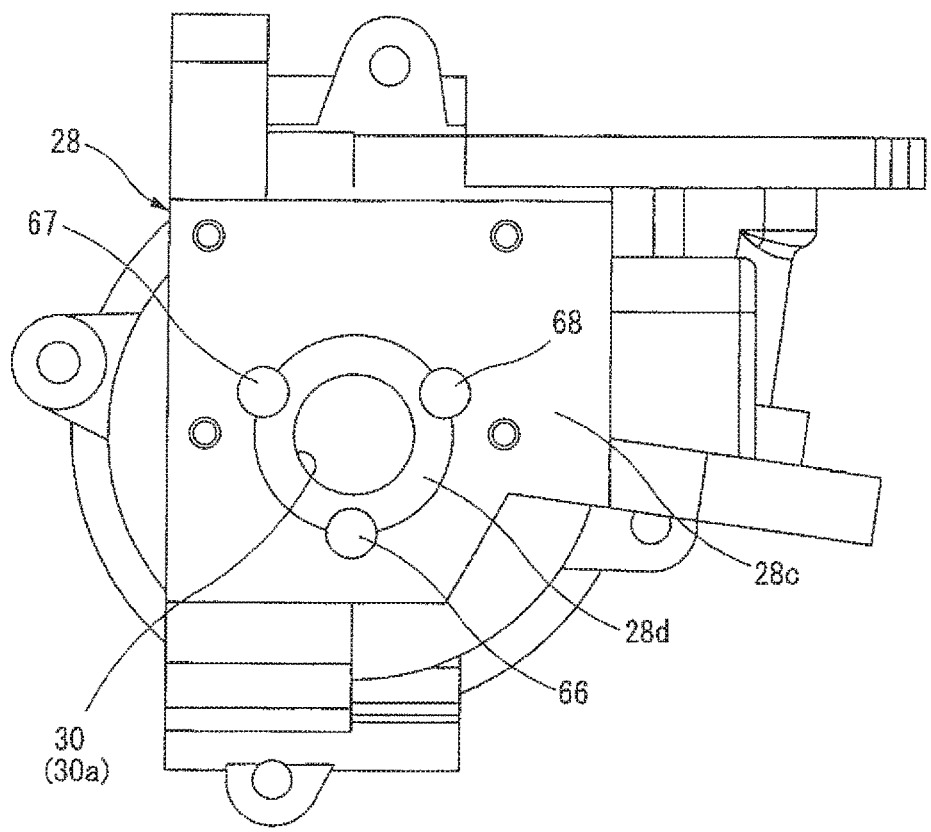
FIG. 7 is a front view of a housing body of the actuator according to the first embodiment of the present invention.

As shown in FIG. 7, a circular groove 28d is formed in substantially the center of a flat front end surface 28c of the housing body 28 so as to be coaxial with the support hole 30.

A holding hole 31 is formed in the housing body so as to axially extend from the support hole 30. An angle sensor 32 is arranged in the holding hole 31 to detect a rotational annular position of the control shaft 13.

The cover 29 is formed of aluminum alloy as in the case of the housing body 28. A motor shaft insertion hole 29a is formed through the center of the cover 29. The cover 29 includes four radially protruding boss portions 29b on an outer circumferential side thereof. Bolt insertion holes are formed in the respective boss portions 29b. Four bolts 43 are inserted in the respective bolt insertion holes from the drive motor 22 side such that the cover 29 is coupled to the housing body 28 by these bolts 43.

The cover 29 also includes an annular second bearing support portion 29c formed protrudingly on an inner circumferential side of an inner end surface thereof at a position facing the first accommodation room 28. Six female thread holes 29d are axially formed in an outer circumferential side of the inner end surface of the cover 29. Bolts 41 are screwed into the respective female thread holes 29d such that the after-mentioned circular spline 38 is coupled to the cover 29 by these bolts 41. Further, female thread holes 29e are formed in a rear end of the cover 20. Bolts 49 are screwed into the respective female thread holes 29e such that the after-mentioned motor housing 45 is coupled to the cover 29 by these bolts 49.

The second bearing support portion 29c is formed to protrude toward the first accommodation room 28a. An annular second support groove 29f is formed in an inner circumference of the second bearing support portion 29c.

Figure 6:
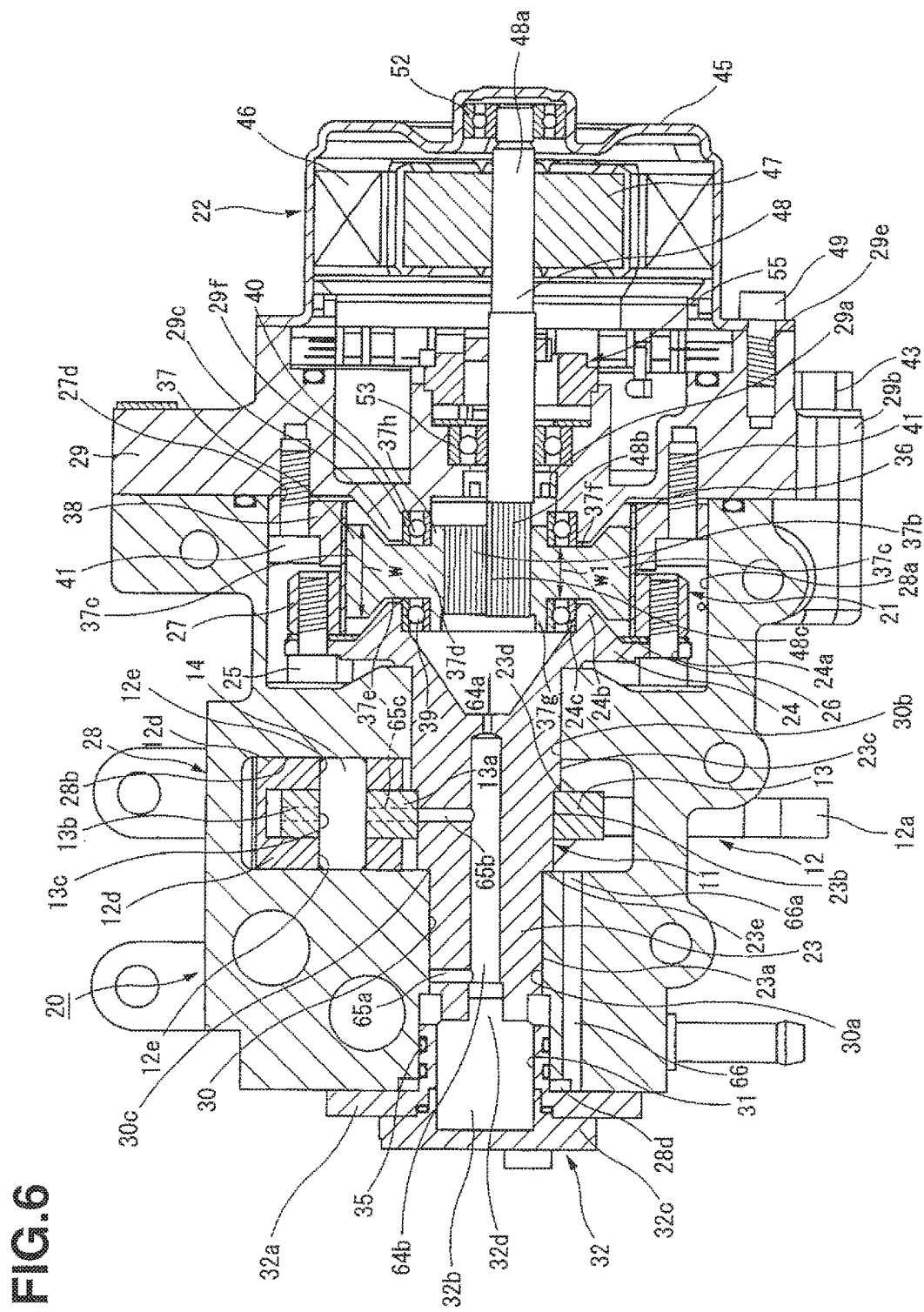
FIG. 6 is a cross-section view of the actuator taken along line A-A of FIG. 4.

As shown in FIG. 6, the connection site between the second end portion 12b of the control link 12 and the arm link 13 by the connection pin 14 is arranged and accommodated in the second accommodation room 28b. The whole space of the second accommodation room 28b is set so as to ensure free pivotal movements of the control link 12 and the arm link 13. Further, the width of the second accommodation room 28b is set slightly larger than the width of the second end portion 12b of the control link 12 so as to suppress backlash during operation of the actuator.

The support hole 30 has an inner circumferential surface stepped in diameter according to the diameter of an outer circumferential surface of the shaft body 23 and, more specifically, includes: a small-diameter first bearing hole 30a in which the first journal portion 23a is supported; a region located at a position corresponding to the fixing portion 23b and opening to the second accommodation room 28b; and a large-diameter second bearing hole 30b in which the second journal portion 23c is supported.

The stepped hole edge 30c of the first bearing hole 30a is formed facing the second accommodation room 28b such that, when the shaft body 23 of the second control shaft is inserted in the support hole 30, the second stepped portion 23e is axially brought into contact with the stepped hole edge 30c to restrict further insertion of the shaft body 23. The maximum insertion position of the shaft body 23 in the support hole 30 is restricted not only by contact of the stepped portion 23e with the stepped hole edge 30c but also by contact of the inner circumferential portion of the fixing flange 24 with the outer hole edge of the second bearing hole 30b.

As shown in FIGS. 2, 3 and 6, the angle sensor 32 includes: a cap-shaped sensor cover 32a fixed by press-fitting to an inner circumferential surface of the holding hole 31; a rotor 32b arranged for angle detection in an inner circumferential side of the sensor cover 32a; and a sensor part 32c arranged at the center of the sensor cover 32a to detect a rotational position of the rotor 32b. The sensor part 32 outputs a detection signal to a control unit (not shown), which is configured to read an operating state of the engine. The rotor 32b has a protruding tip end portion 32d fixed by press-fitting in a tip end fixing hole of the shaft body 23.

A gasket 33 is disposed so as to provide a seal between the sensor cover 32a and the holding hole 31. The sensor cover 32a is fixed, together with the sensor part 32c, to the front end surface 28c of the housing body 28 by two bolts 34.

Three O-rings 35 are disposed on an outer circumference of a cylindrical portion of the sensor cover 32a so as to restrict the entry of oil into the sensor part 32c.

As shown in FIGS. 6, 7, 11A and 11B, three linear though holes 66, 67 and 68 (as support jig insertion holes) are formed through the housing body 28 so as to extend from the front end surface 28c axially of the support hole 30 (control shaft 13). The sensor cover 32a is fixed to the front end surface 28c of the housing body 28 in a state that an integrally formed disc-shaped cap end portion of the sensor cover 32a avoids the groove 28d.

Each of the through holes 66 to 68 has a circular cross section with a small diameter. The through holes 66 to 68 are located symmetrically with respect to the center axis of the support hole 30, i.e., at circumferentially equally spaced intervals so as to lie radially over an outer circumferential edge of the groove 28d. These through holes 66 to 68 have respective tip ends 66a to 68a facing the second accommodation room 28b.

The formation positions of the through holes 66 to 68 are set such that, when the arm link 13 is placed in position in the second accommodation room 28b, the through holes 66 to 68 are circumferentially equally spaced around an outer circumferential edge of the press-fitting hole 13a of the arm link 13.

Among the through holes 66 to 68, the lower-side through hole 66 is in communication with the groove 28 so as to provide a communication between the holding hole 31 and the second accommodation room 28b. This through hole 66 serves as a guide hole that, when a lubricating oil flows in the holding hole 31, guides the lubricating oil from the holding hole to the second accommodation room 28b.

The reduction gear unit 21 is of the harmonic gear type. Components of the reduction gear unit 21 are arranged and accommodated in the first accommodation room 28a of the housing body 28, which is closed by the cover 29. More specifically, the reduction gear unit 21 includes: the annular first circular spline 27 fixed by bolts to the fixing flange 24 and having a plurality of internal gear teeth 27a formed on an inner circumferential surface thereof; a flex spline 36 arranged in the first circular spline 27 and having a plurality of external gear teeth 36a formed on an outer circumferential surface thereof and engaged with the internal gear teeth 27a; a wave generator 37 as a wave generation element having an oval outer circumferential surface slidable along a part of the inner circumferential surface of the flex spline 36; and the second circular spline 38 arranged on an axially one side of the first circular spline 27 and having internal gear teeth 38a formed on an inner circumferential surface thereof and engaged with the respective external gear teeth 36a of the flex spline 36.

Six female thread holes 27b are formed in the first circular spline 27 at circumferentially equally spaced intervals such that the bolts 25 are screwed into the respective female thread holes 27b.

The flex spline 36 is formed of a metal material in a thin, deflective deformable cylindrical shape. The number of the external gear teeth 36a of the flex spline 36 is set smaller by one than the number of the internal gear teeth 27a of the first circular spline 27.

As also shown in FIG. 6, the wave generator 37 has a substantially annular shape with a relatively large-diameter through hole 37a through the center thereof and a plurality of internal gear teeth 37b formed on an inner circumference of the through hole 37a. The oval outer circumferential surface of the wave generator 37 is made flat so as to slide on the flat inner circumferential surface of the flex spline 36.

The axial width W of an outer circumferential portion 37c of the wave generator 37 is set relatively small. Depressions 37e and 37f are formed in both axial end sides of an inner circumferential portion 37d of the wave generator 37. Thus, the wave generator 37 as a whole is constricted in shape by setting the axial width W1 of the inner circumferential portion 37d sufficiently smaller than the axial width W of the outer circumferential portion 37c due to the formation of the depressions 37e and 37f.

Cylindrical protrusions 37g and 37h are integrally formed at axial front and rear edges of the though hole 37a on an inner side of the inner circumferential portion 37. Front and rear ball bearings 39 and 40 are respectively arranged between the protrusion 37g and first support groove 24c of the fixing flange 24 and between the protrusion 37h and the second support groove 29f of the cover 29. The whole of the wave generator 37 is rotatably supported by these ball bearings 39 and 40.

The first ball bearing 39 has an inner race press-fitted on an outer circumferential surface of the protrusion 37g and an outer race press-fitted in an inner circumferential surface of the first support groove 24c. The second ball bearing 40 has an inner race press-fitted on an outer circumferential surface of the protrusion 37g and an outer race press-fitted in an inner circumferential surface of the second support t groove 29f. Axially opposed inner portions of the first and second ball bearings 39 and 40 are located inwardly of the axial width W of the outer circumferential portion 37c so as to radially overlap the outer circumferential portion 37c.

Six bolt insertion holes are formed in an outer circumferential flange portion 38b of the second circular spline 28 such that the second circular spline 28 is coupled to an inner end portion of the cover 29 via a second thrust plate 42 by insertion of the bolts 41 in the respective bolt insertion holes. The number of the internal gear teeth 38c of the second circular spline 38 is set equal to the number of the external gear teeth 36a of the flex spline 36, that is, set smaller by one than the number of the internal gear teeth 27a of the first circular spline 27. By such a difference in gear teeth number, the speed reduction ratio is determined.

The drive motor 22 is in the form of a blushless electric motor. More specifically, the drive motor 22 has: a bottomed cylindrical-shaped motor casing 45; a cylindrical coil 46 fixed to an inner circumferential surface of the motor casing 45; a magnetic rotor 47 rotatably disposed in the coil 46; and a motor shaft 48 having one end portion 48a fixed to the axial center of the magnetic rotor 47 as shown in FIGS. 3 and 6.

The motor casing 45 includes four boss portions 45a on an outer circumferential side of a front end thereof. Bolt insertion holes 45b are formed in the respective boss portions 45a. The motor casing 45 is fixed to the rear end of the cover 29 via an O-ring 50 by insertion of the bolts 49 into the bolt insertion holes 45b. The motor casing 45 also includes a connector portion 44 formed integrally on the outer circumference thereof for input of a control current from the control unit.

The magnetic rotor 47 has positive and negative magnetic poles circumferentially alternately arranged on an outer circumference thereof. A fixing hole 47a is axially formed through the center of the magnetic rotor 47 such that the one end portion 48a of the motor shaft 48 is fixed by press-fitting in the fixing hole 47a.

A ball bearing 52 is provided, with an outer race thereof fixed to an inner circumference of an end wall of the motor casing 45. The one end portion 48a of the motor shaft 48 has a tip end region protruding from an end surface of the magnetic rotor 47 and supported by the ball bearing 52. A ball bearing 53 is provided, with an outer race thereof fixed to an inner circumference of the motor shaft insertion hole 29a of the cover 29. The other end portion 48b of the motor shaft 48 is supported by the ball bearing 53. The motor shaft 48 has outer gear teeth 48c formed on an outer circumferential surface of the other end portion 48b and engaged with the inner gear teeth 37b of the wave generator 37.

The ball bearing 53 is supported in a retaining groove of the cover 29 by screws through a substantially disc-shaped retainer 54.

A resolver 55 is arranged at a substantially axially middle position of the motor shaft 48 to detect a rotational angle of the motor shaft 48. This resolver 55 includes: a resolver rotor 55a fixed by press-fitting on the outer circumference of the motor shaft 48; and a sensor part 55b configured to detect a multi-leaf target on an outer circumferential surface of the resolver rotor 55. The sensor part 55b is fixed in the cover 29 by two screws 56 and configured to output a detection signal to the control unit.

The second control shaft 11 has, formed therein, an axial introduction part that introduces a lubricating oil pressurized and fed by an oil pump (not shown) and a plurality of radial holes 65a and 65 that communicate with the introduction part. The introduction part is provided with a conical oil chamber 64a and an axial hole 64b. The oil chamber 64a is formed through the center of the fixing flange 24 so as to receive the lubricating oil from through an oil hole. The axial hole 64b is formed axially in the center of the second control shaft 11 so as to extend from the oil chamber 64a.

The radial hole 65a has an inner end opening to a tip end region of the axial hole 64 and an outer end opening to a clearance between the outer circumferential surface of the first journal portion 23a and the first bearing hole 30a, so as to supply the lubricating oil to this clearance. As shown in FIG. 6, the radial hole 65b communicates with an oil hole 65c inside the arm link 13 so as to supply the lubricating oil to between the inner circumferential surface of the connection hole 13c and the outer circumferential surface of the connection pin 14.

Figure 8:
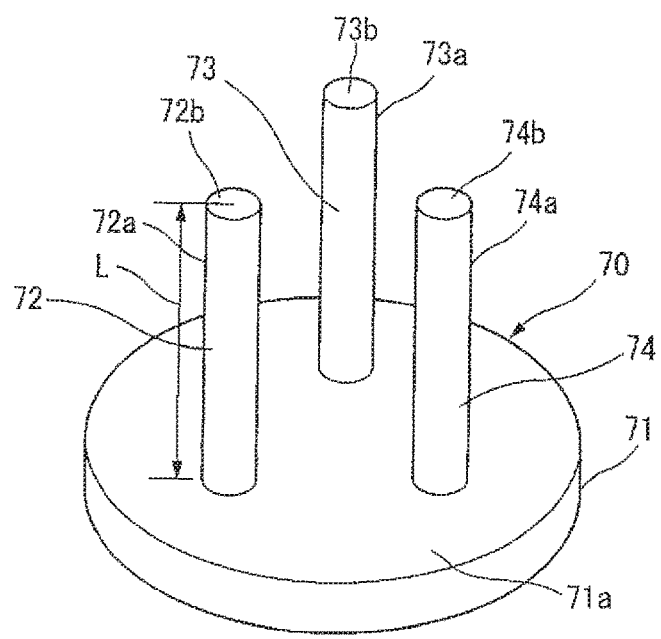
FIG. 8 is a perspective view of a support jig according to the first embodiment of the present invention.
Figure 9:
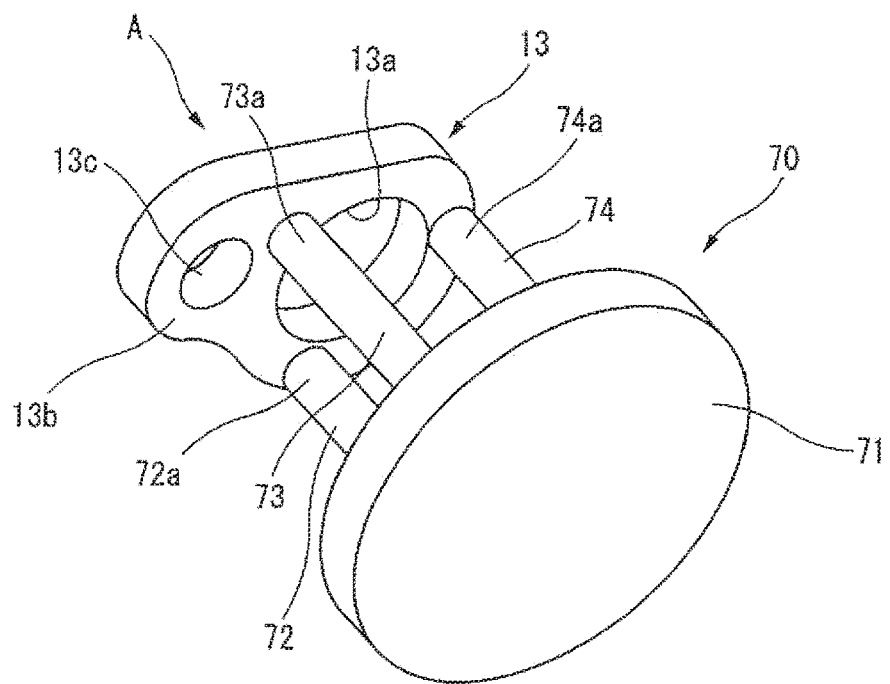
FIG. 9 is a perspective view showing a state that insertion support parts of the support jig are brought into contact with an arm link of the actuator.
Figure 10:
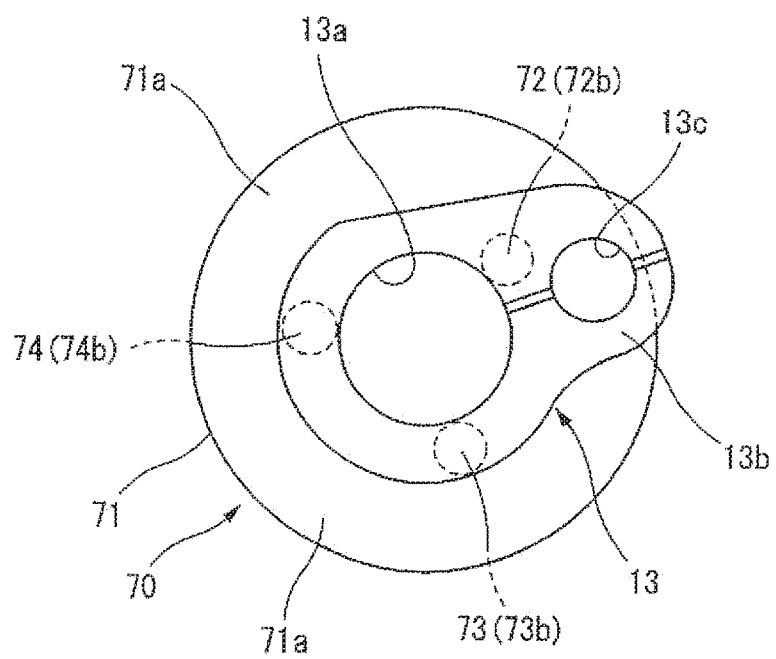
FIG. 10 is an elevational view, as viewed in the direction of an arrow A of FIG. 9, showing the state that the insertion support parts of the support jig are brought into contact with the arm link of the actuator.

In the present embodiment, a support jig 70 shown in FIGS. 8 and 9 is used for assembling the second control shaft 11 and the arm link 13 into the support hole 30 and the second accommodation room 28b of the housing body 28, respectively.

The support jig 70 includes: a disc-shaped support substrate part 71 contactable with the front end surface 28c of the housing body 28; and three insertion support parts 72, 73 and 74 integrally protrudingly formed on one end surface 71a of the support base part 71 and insertable through the respective through holes 66 to 68.

The support base part 71 is formed in one piece of iron-based metal material. The outer diameter of the support base part 71 is set slightly smaller than the surface area of the front end surface 28c of the housing body 28 such that substantially the whole of the one end surface 71a can be brought into contact with the front end surface 28c of the housing body 28.

The insertion support parts 72 to 74 are formed of iron-based metal material at positions symmetric with respect to the center of the one end surface 71a of the support base part 71 (i.e. at circumferentially equally spaced intervals) so as to correspond to the through holes 66 to 68. Each of these insertion support parts has a substantially circular cross section. The outer diameter of the respective insertion support part 72 to 74 is set to a slightly smaller size than the inner diameter of the respective through holes 66 to 68 such that the insertion support parts 72 to 74 can be inserted through and removed from the through holes 66 to 68.

Further, the length L of the respective insertion support parts 72, 73 and 74 is set uniform such that, when the insertion support parts 72, 73 and 74 are inserted in the through holes 66 to 68 to bring the one end surface 71a of the support base part 71 into contact with the front end surface 28c of the housing body 28, tip end portions 72a to 74a of the insertion support parts 72 to 74 protrude from the tip ends 66a to 68a of the through holes 66 to 68 and protrude in the second accommodation room 28.

The respective tip end portions 72a to 74b are formed with flat tip end faces 72b to 74b so as to ensure high levelness of the arm link 13 mounted on these tip end faces 72b to 74b as will be explained later.

[Component Assembling Method]

A method for assembling the second control shaft 11 and the link arm 13 together in the housing body 28 according to the present embodiment will be explained below.

Figure 11:
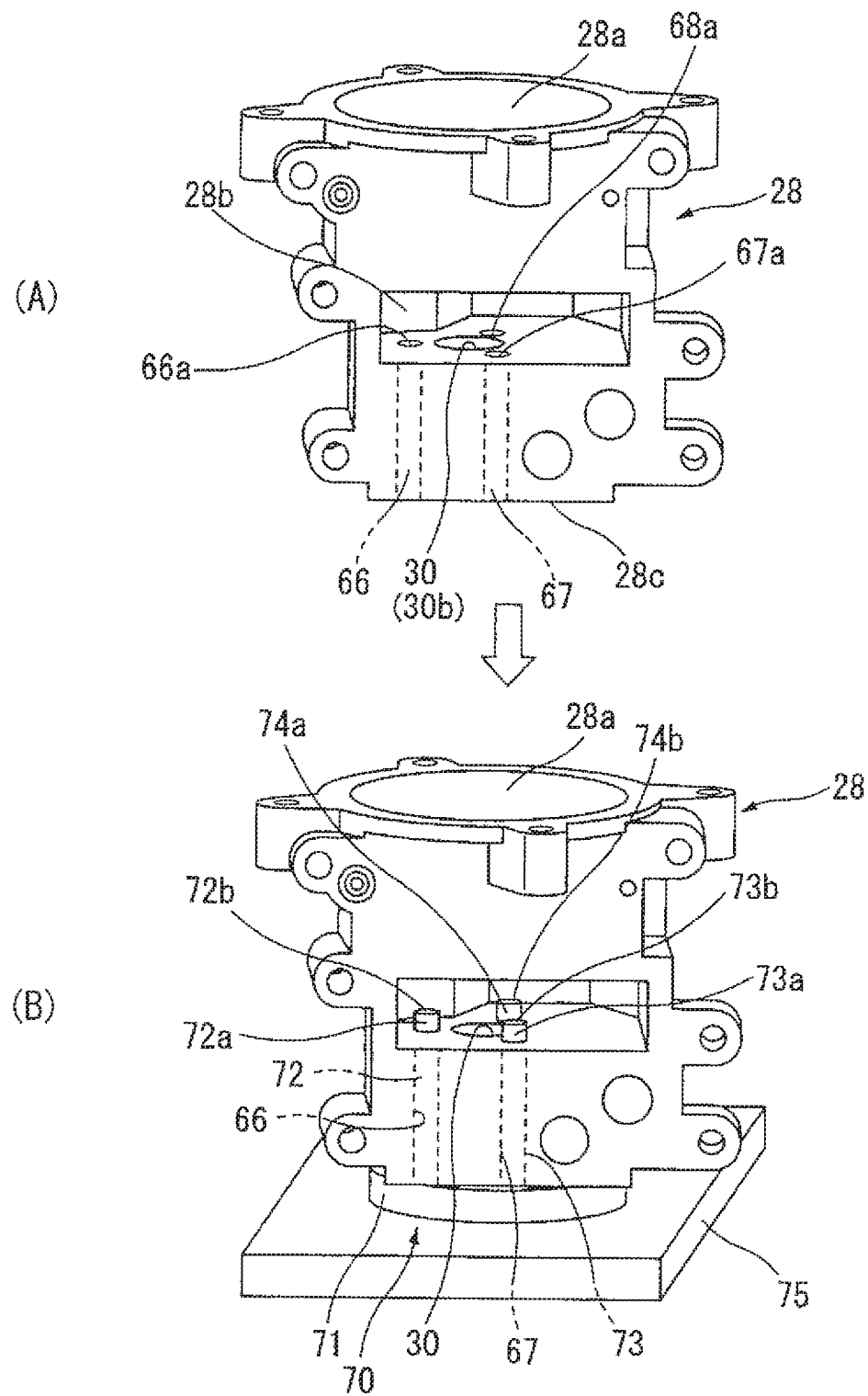
FIG. 11 is a schematic view showing a step of inserting the insertion support prats into the housing body, where

While holding the housing body 28 with its one end surface 28c down and placing the three tip end portions 72a to 74a of the insertion support parts 72 to 74 of the support jig 70 in position relative to the corresponding three through holes 66 to 68, the insertion support parts 72 to 74 of the support jig 70 are inserted from down through the respective through holes 66 to 68 until the one end surface 71a of the support base part 71 comes into contact with the front end surface 28c of the housing body 28 as shown in FIGS. 11A and B.

In this state, the tip end portions 72a to 74a of the three insertion support parts 72 to 74 protrude in the second accommodation room 28b.

The housing body 28 is then stably supported by bringing the other end surface of the support base part 71 into contact with a base stage 57 while holding the housing body 28 with the support jig 70 as shown in FIG. 11B.

Figure 12:
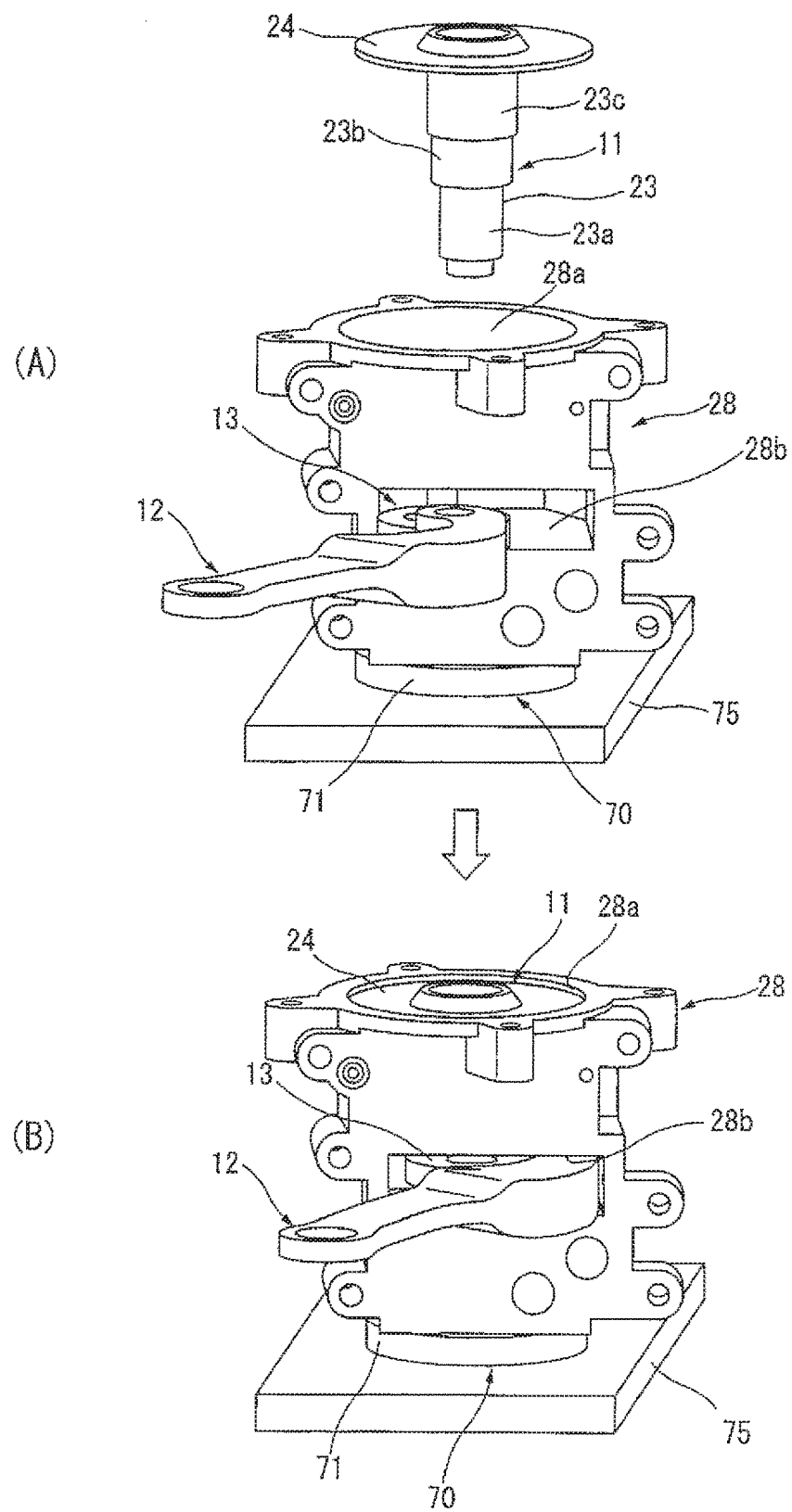
FIG. 12 is a schematic view showing steps of inserting the arm link into the housing body through a control link and inserting a second control shaft into the housing body, where
Figure 13:
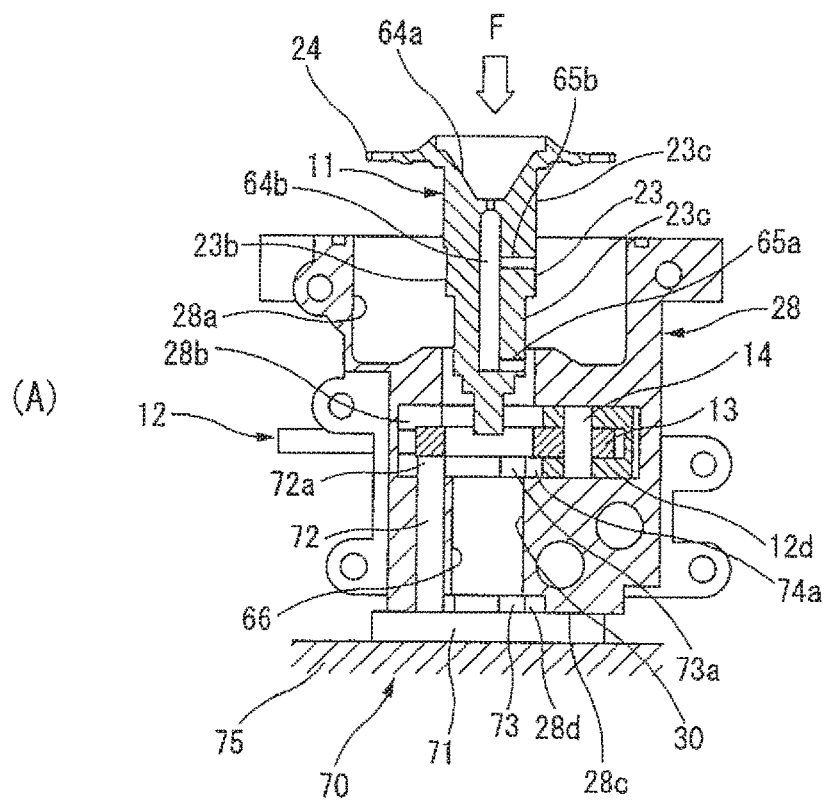
FIG. 13 is a schematic view showing a step of press-fitting the second control shaft into the arm link while holding the arm link with the support jig in the housing body, where
Figure 13:
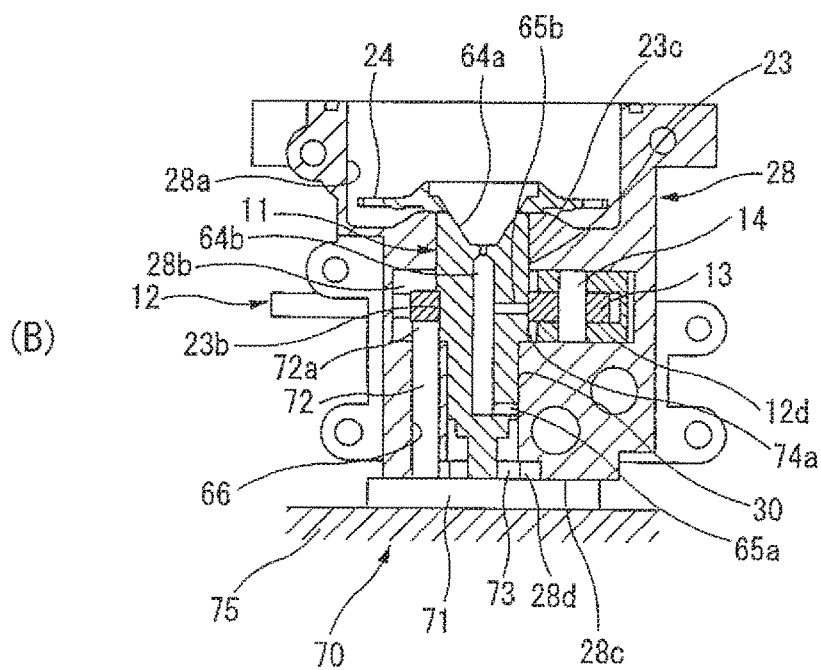

Subsequently, the arm link 13 is inserted from the lateral side into the second accommodation room 28 and placed in position by arrangement of the lower side surface of the arm link 13 on the flat tip end faces 72b to 74b of the insertion support parts 72 to 74 in a state that the second end portion 12b of the second control link 12 is connected to the protrusion portion 13b of the arm link 13 by the connection pin 14 as shown in FIGS. 12 and 13.

As shown in FIGS. 12 and 13, the shaft body 23 of the second control shaft 11 is inserted into the press-fitting hole 13a of the arm link 13 from the tip end side (i.e. the first journal portion 23a side) so that the outer circumferential surface of the fixing portion 23b is axially press-fitted in the press-fitting hole 13a until the first stepped portion 23d comes into the one hole edge of the press-fitting hole 13a.

In the above press-fitting step, the press-fitting load F of the second control shaft 11 (i.e. the load acting in the direction of an arrow) is equally received by the tip end faces 72b to 74b of the insertion support parts 72 to 74 and ultimately received by the base stage 75 through the support base part 71.

After that, the support jig 70 is detached by pulling the support base part 11 and removing the insertion support parts 72 to 74 from the through holes 66 to 68. With this, the assembling of the arm link 13 to the second control shaft 11 is completed.

As explained above, the second control shaft 11 and the arm link 13 are formed as separate pieces and assembled together within the accommodation room 28b in the present first embodiment. In contrast to the conventional case where the second control shaft 11 and the arm link 13 are integrally formed as one piece, the motor insertion shaft 20 of the housing body 28 does not need to be formed with a large inner diameter for insertion of the arm link 13 or does not need to be divided into upper and lower parts in the present first embodiment.

It is accordingly possible to prevent upsizing of the housing 20, allow size/weight reduction of the housing 20 and thereby improve the mountability of the variable compression ratio mechanism on the internal combustion engine.

Since the second control shaft 11 and the arm link 13 are formed separately from each other, the aim link 13 attains an improved degree of freedom in length. The length of the arm link 13 can be set to a longer value according to the size of the accommodation room 28b. It is thus possible to reduce the reverse input load from the control link 12 toward the second control shaft 11 for reduction of load on the reduction gear unit 21 and the drive motor 22.

In the present first embodiment, the assembling of the aim link 13 and the second control shaft 11 in the housing body 24 is performed by inserting and removing the support jig 70 in and from the through holes 66 to 68 as explained above. It is thus possible to ease and facilitate the assembling work of the actuator and improve the efficiency of the assembling work.

In the case where the assembling work is performed without the use of the support jig 70, the load for press-fitting the arm link 13 on the second control shaft 12 has to be directly received by the inner surface of the housing. In order to avoid such direct load, it is conceivable to dispose an additional support member between the inner surface of the housing body 28 and the arm link 13 and bring one end surface of the additional support member into contact with one inner side surface of the second accommodation room 28b of the housing body 28.

In this case, high-precision flattening process needs to be performed on the one inner side surface of the second accommodation room 28b so as to prevent tilting of the additional support member in the second accommodation room 28b. Such flattening process is difficult and unavoidably results in processing cost increase.

In the present first embodiment, by contrast, the large load F for pressing the second control shaft 11 onto the arm link 13 is received by the base stage 75 through the insertion support parts 72 to 74 and the support base part 71 of the support jig 70 rather than by the one side surface of the second accommodation room 28b. There is no need in the present first embodiment to perform any processing for increasing the flatness of the one side surface of the second accommodation room 28b. It is thus possible to avoid increase in processing cost.

Further, the support jig provides three-point support of the arm link 13 by means of the three insertion support parts 72 to 74. It is thus possible to ensure good support balance of the arm link 13 and easily maintain overall levelness of the arm link 13.

In the actuator, the lubricating oil flows from the oil chamber 64a through the axial hole 64b and the first radial hole 65a to lubricate the clearance between the first journal portion 23a to the first bearing hole 30a, and then, flows into the holding hole 31. This lubricating oil is promptly discharged to the second accommodation room 28b through the through hole 66 without accumulating in the holding hole 31.

The rotor 32b and the sensor part 32c of the angle sensor 32 accommodated in the holding hole 31 is thus not exposed to the high-temperature lubricating oil. It is possible to suppress accuracy deterioration of the sensor part 32 by such high temperature.

Furthermore, the wave generator 37 is formed with a small overall axial length and constricted in shape as the axial width W1 of the inner circumferential portion 37 is set small due to the formation of the depressions 37e and 37f on both axial end sides of the inner circumferential portion 37 in the present first embodiment. The ball bearings 39 and 40 are thus located closer to each other. In other words, the cover 29 and the fixing flange 24, which respectively support the ball bearings 39 and 40, are located closer to each other so as to sufficiently reduce the overall axial length of the housing 20. It is possible to achieve downsizing the entire housing 20 in the axial direction by reducing the axial length of the housing 20 in combination of the size reduction of the housing body 28.

In addition, the position of the fixing flange 24 is slightly shifted toward the cover 29 so as to increase the axial length of the second bearing hole 30b. It is consequently possible to increase the area of support of the second journal portion 23c by the second bearing hole 30b and thereby possible to receive larger load by the second bearing hole 30b.

The detail is as follows. When a large alternating torque generated by the piston 1 is transmitted to the control link 12 and then transmitted from the arm link 13 to the shaft body 23 of the second control shaft 11, large load is applied from the first and second journal portions 23a and 23c to the inner circumferential surfaces of the first bearing holes 30a and 30b. As a result, the surface pressure between the journal portions 23a and 23c and the bearing holes 30a and 30b becomes high. By this high surface pressure and high-speed sliding friction, the inner circumferential surfaces of the first and second bearing holes 30a and 30b, which are made of aluminum alloy, may be worn to cause a relatively large clearance between the journal portions 23a and 23c and the bearing holes 30a and 30b.

The occurrence of such a large clearance makes it likely that the front first-journal-portion 23a side of the second control shaft 11 will swing about the second ball bearing 40 so as to thereby allow the alternating load to act on the first ball bearing 39 and on the flex spline 36 through the wave generator 37. In the conventional actuator, the inner circumferential portion of the wave generator 37 is made axially long so that the amount of swinging of the control shaft about the second ball bearing 40 becomes large to readily cause deflection deformation of the flex spline 36 by large offset load or cause poor lubrication or local surface pressure increase of the first ball bearing 39 by partial raceway surface contact. This leads to durability deterioration.

In the present first embodiment, the position of the first ball bearing 39 is shifted toward the drive motor 22. As the fixing flange 24 is shifted in the same direction, the axial length of the second bearing hole 30d is increased to increase the amount of overhang from the second ball bearing 40 as the swing fulcrum to the flex spline 36 and first ball bearing 39 as the action point and suppress the amount of swinging of the shaft body 23. It is consequently possible to decrease partial deflection of the flex spline 36 and prevent partial contact of the second ball bearing 40 for suppression of durability deterioration.

Since the shaft body 23 is supported at the first and second journal portions 23a and 23c thereof in the first and second bearing holes 30a and 30b of the support hole 30, it is possible to stably support the second control shaft 11 all the time and more effectively suppress vibrations and noises caused due to the alternating load.

Moreover, the diameter of the shaft body 23 is stepwisely decreased (in bamboo shoot form) from the maximum-diameter second journal portion 23b to the middle-diameter fixing portion 23b and then to the minimum-diameter first journal portion 23a in the present first embodiment. It is thus possible to ensure the insertability of the shaft body 23 in the support hole 30.

It is further possible to ease and facilitate the coupling of the arm link 13 and the shaft body 23 because the arm link 13 is fixed by press-fitting to the fixing portion 23b of the shaft body 23 through the press-fitting hole 13a.

During insertion of the shaft body 23 in the support hole 30, the shaft body 23 is easily axially fixed in position by contact of the second stepped portion 23e of the shaft body 23 with the stepped hole edge 30c of the support hole 30. Further, the axial position of the arm link 13 is restricted by the first stepped portion 23d of the shaft body 23 during press-fitting of the arm link. It is thus possible to achieve easy positioning of these components.

In the present first embodiment, the shaft body 23 of the second control shaft 11 is integrally formed of iron-based metal material; and the whole of the housing 20 with the first and second bearing holes 30a and 30b is formed of aluminum alloy. The first bearing hole 30a is made small in diameter so as to lessen difference between iron and aluminum alloy due to thermal expansion and shrinkage. It is thus possible to suppress backlash between the first journal portion 23a and the first bearing hole 30a.

[Second Embodiment]

Figure 14:
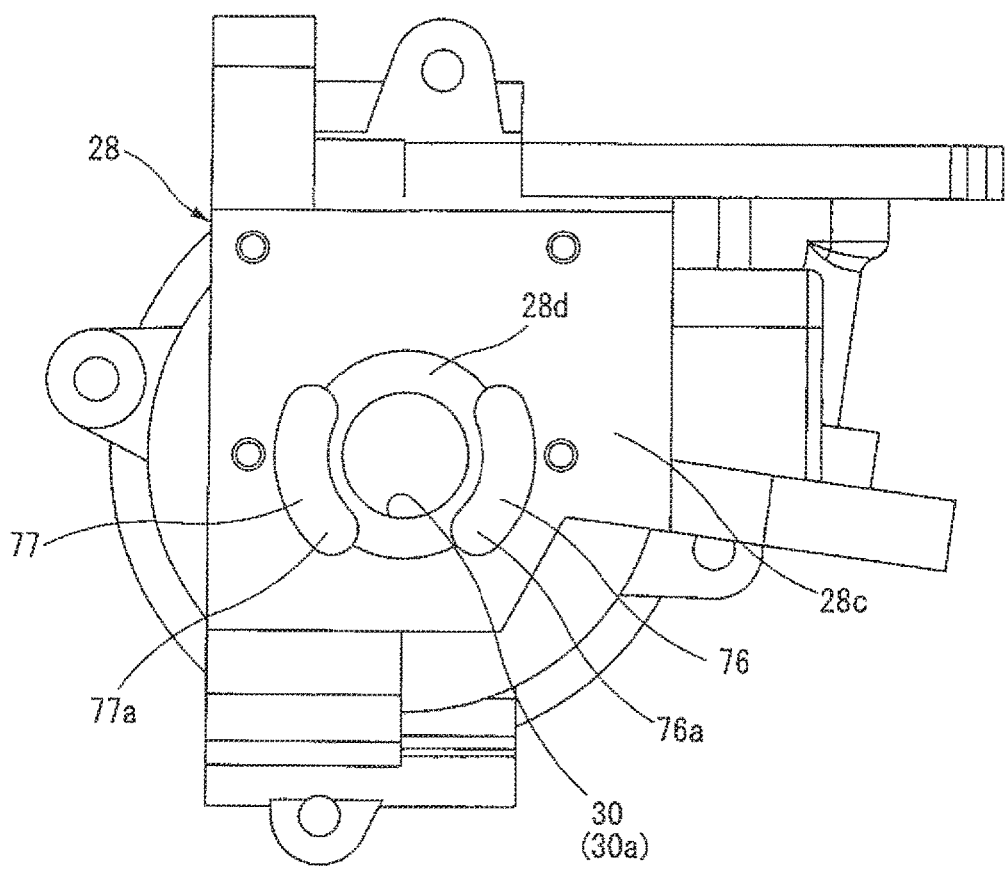
FIG. 14 is a front view of a housing body of the actuator according to a second embodiment of the present invention.

FIG. 14 is a schematic view showing the second embodiment in which: the housing body 28 has two through holes formed therethrough from the front end surface 28c to the second accommodation room 28b; and the support jig have two insertion support parts insertable through the corresponding through holes.

The two through holes 76 and 77 are formed in the housing body at positions symmetric with respect to the center axis of the support hole 30 (i.e. the axis of the second control shaft 11) and each has a substantially arc-shaped elongated cross section centered on the axis. Namely, the two through holes 76 and 77 are symmetrically formed along an outer circumferential edge of the groove 28d. Lower end regions 76a and 77a of the through holes 76 and 77 are in communication with the holding hole 31 and the second accommodation room 28b through the groove 28d such that the lubricating oil in the holding hole 31 flows out from the groove 28d to the second accommodation room 28d through these through holes 76 and 77.

On the other hand, the two insertion support parts are formed on the support jig at positions symmetric with respect to the center of the support base part and each have a substantially arc-shaped cross section according to the cross section of the through holes.

As explained above, the two insertion support parts are provided corresponding to the two through holes 73 and 74 in the present second embodiment. It is thus possible to ease and facilitate the insertion of the insertion support parts through the corresponding through holes 76 and 77.

Further, each of the two insertion support parts has a flat tip end surface with a relatively large surface area. It is thus possible to stably support one side surface of the arm link 13 by these insertion support parts.

As the other configurations of the second embodiment are the same as those of the first embodiment, it is possible in the second embodiment to obtain the same effects as in the first embodiment.

It should be understood that the present invention is not limited to the above-mentioned embodiments. For example, the arm link 13 and the shaft body 23 may be fixed by any means other than press-fitting, such as spline connection or bolt connection.

The present invention is applicable to not only an actuator for a variable compression ratio mechanism of an internal combustion engine but also an actuator for the other type of link mechanism of an internal combustion engine.

The present invention can be applied to e.g. an actuator for a variable valve apparatus of an internal combustion engine as a link mechanism capable of changing its attitude and thereby varying the lift amount of an engine value as disclosed in JP 2014-5756 A.

The invention claimed is:

1. A method of assembling an actuator for a link mechanism of an internal combustion engine,
   the actuator comprising:
   a control link having one end connected to the link mechanism of the internal combustion engine;
   an arm link pivotally connected to the other end of the control link;
   a control shaft to which the arm link is fixed by press-fitting;
   a housing having a support hole formed to rotatably support therein the control shaft and an accommodation room formed in a direction intersecting a center axis of the support hole to accommodate therein at least a part of the arm link; and
   a motor arranged to rotate and drive the control shaft,
   the housing further having a through hole formed therethrough from an outer surface of the housing to the accommodation room in an axial direction of the control shaft,
   the method comprising:
   inserting a support jig into the through hole from the outside of the housing, thereby allowing a tip end portion of the support jig to protrude in the accommodation room;
   inserting the arm link into the accommodation room and bringing one side surface of the arm link into contact with the tip end portion of the support jig; and
   inserting the control shaft in the support hole and press-fitting the control shaft into a press-fitting hole of the arm link.

2. The method of assembling the actuator for the link mechanism of the internal combustion engine according to claim 1,
   wherein the support jig has a cylindrical column-shaped insertion support part insertable through the through hole.

3. The method of assembling the actuator for the link mechanism of the internal combustion engine according to claim 2,
   wherein the through hole is a plurality of through holes substantially equally spaced about an axis of the control shaft.

4. The method of assembling the actuator for the link mechanism of the internal combustion engine according to claim 3,
   wherein the insertion support part has a flat tip end face.

5. The method of assembling the actuator for the link mechanism of the internal combustion engine according to claim 2,
   wherein the through hole is three through holes;
   wherein the insertion support part is three insertion support parts.

6. The method of assembling the actuator for the link mechanism of the internal combustion engine according to claim 2,
wherein the through hole is at least two through holes; and
wherein the insertion support part is at least two insertion support parts.

7. The method of assembling the actuator for the link mechanism of the internal combustion engine according to claim 6,
wherein the through holes each have a substantially arc-shaped elongated cross section centered on an axis of the control shaft; and
wherein the insertion support parts each have a substantially arc-shaped cross section according to the cross section of the through holes.

8. The method of assembling the actuator for the link mechanism of the internal combustion engine according to claim 1,
wherein the through hole is circular in cross section.

9. The method of assembling the actuator for the link mechanism of the internal combustion engine according to claim 1,
wherein the through hole is three through holes; and
wherein the support jig is formed with three insertion support parts corresponding to the respective through holes.

10. An actuator for a link mechanism of an internal combustion engine, comprising:
a control link having one end connected to the link mechanism of the internal combustion engine;
an arm link pivotally connected to the other end of the control link;
a control shaft to which the arm link is fixed by press-fitting;
a housing having formed therein a support hole to rotatably support therein the control shaft an accommodation room formed in a direction intersecting a center axis of the support hole to accommodate therein at least a part of the arm link; and
a motor arranged to rotate and drive the control shaft,
wherein the housing has a support jig insertion hole formed therethrough from an outer surface of the housing to the accommodation room in an axial direction of the control shaft.

11. The actuator for the link mechanism of the internal combustion engine according to claim 10,
wherein the support jig insertion hole is formed to allow insertion of a support jig that, when inserted in the support jig insertion hole, supports the arm link in the accommodation room.

12. The actuator for the link mechanism of the internal combustion engine according to claim 11,
wherein the housing has a plurality of support jig insertion holes; and
wherein the support jig has a plurality of insertion support parts insertable through the respective support jig insertion holes such that, when the insertion support parts are inserted through the respective support jig insertion holes, tip end portions of the insertion support parts support one side surface of the arm link in the accommodation room.

13. The actuator for the link mechanism of the internal combustion engine according to claim 11,
wherein the housing has three or more support jig insertion holes formed at positions symmetric with respect to an extension of an axis of the control shaft; and
wherein the support jig has three or more cylindrical column-shaped insertion support parts formed corresponding to the respective support jig insertion holes.

14. The actuator for the link mechanism of the internal combustion engine according to claim 10,
wherein the support jig insertion hole has a circular cross section.

15. The actuator for the link mechanism of the internal combustion engine according to claim 14,
wherein the insertion support part has a circular cross section according to the cross section of the support jig insertion hole.

16. The actuator for the link mechanism of the internal combustion engine according to claim 10, further comprising:
a supply part for supplying a lubricating oil to the support hole;
a sensor room located in a tip end side of the support hole; and
an angle sensor arranged in the sensor room to detect a rotational annular position of the control shaft,
wherein the support jig insertion hole is formed so as to provide a communication between the sensor room and the accommodation room and, when the lubricating oil flows in the sensor room, guide the lubricating oil to the accommodation room.

17. The actuator for the link mechanism of the internal combustion engine according to claim 16,
wherein the housing has a plurality of support jig insertion holes, one of which is formed on a lower side with respect to an axis of the control shaft in a direction of gravity.

18. The actuator for the link mechanism of the internal combustion engine according to claim 17,
wherein the supply part is in the form of a lubricating oil supply passage that provides a communication from the inside of the housing to the support hole.

19. The actuator for the link mechanism of the internal combustion engine according to claim 16,
wherein the supply part includes a communication hole that provides a communication from the inside of the control shaft to a surface of a journal portion of the control shaft.

* * * * *